Jan. 29, 1957
A. F. PITYO
2,779,858
METHOD OF PRODUCING METALLIC RIBBON ATTACHING
ELEMENT AND WELDING THE SAME
Filed May 10, 1955
2 Sheets-Sheet 1
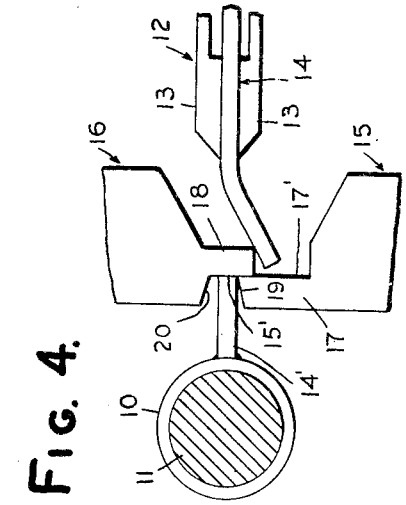
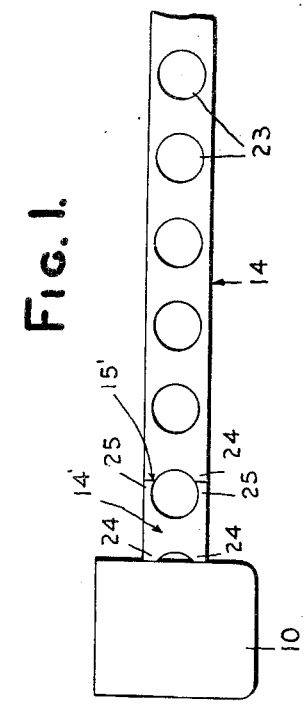
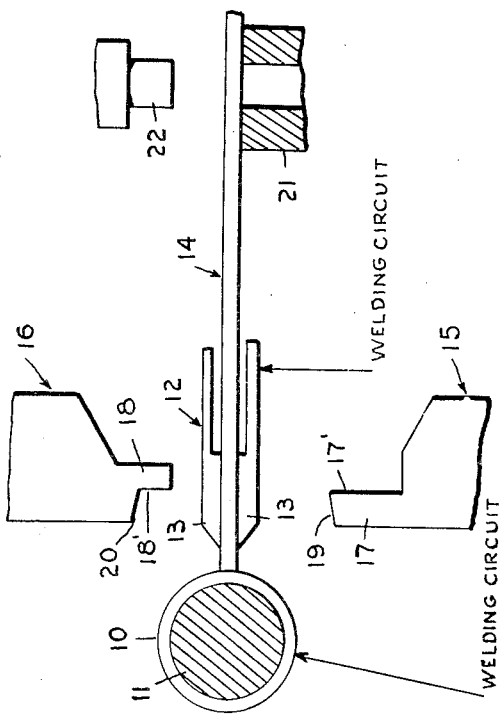
INVENTOR
ALBERT F. PITYO
BY
ATTORNEY

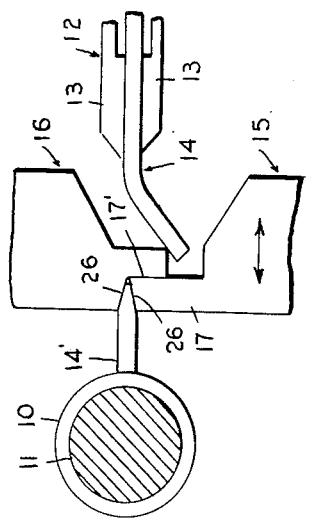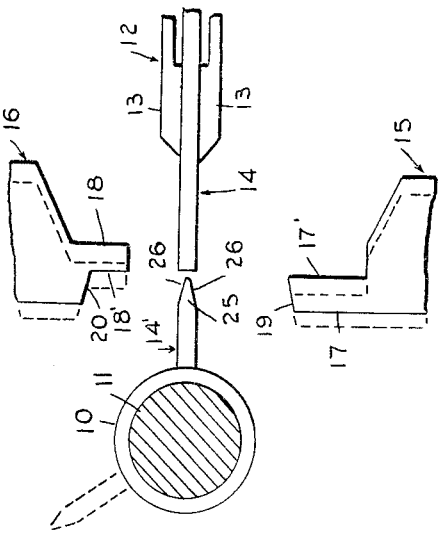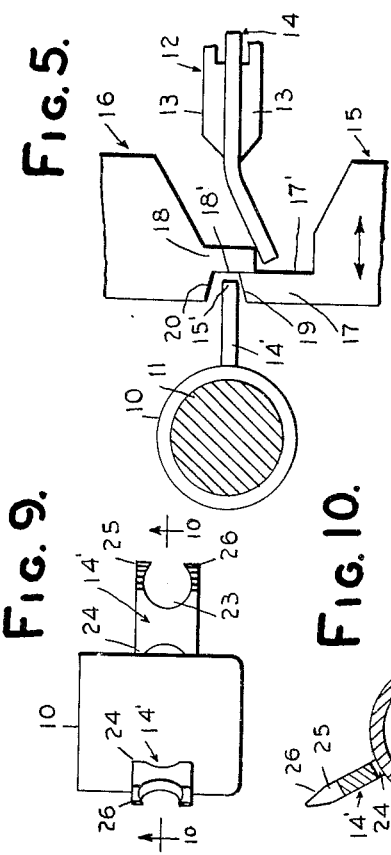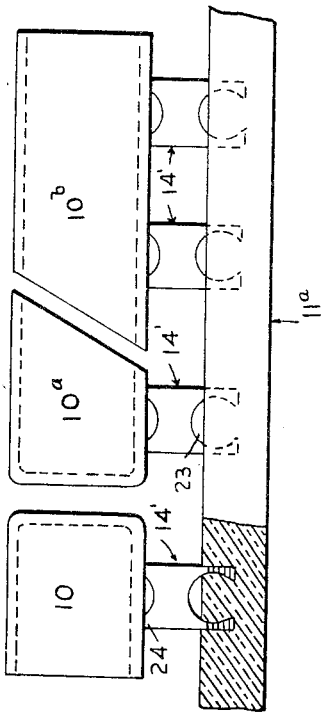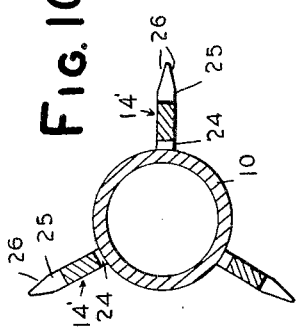

United States Patent Office 2,779,858
Patented Jan. 29, 1957

2,779,858

METHOD OF PRODUCING METALLIC RIBBON ATTACHING ELEMENT AND WELDING THE SAME

Albert F. Pityo, Cedar Grove, N. J.

Application May 10, 1955, Serial No. 507,318

13 Claims. (Cl. 219—78)

My invention relates to a method of producing a metallic ribbon attaching element, to a method of securing the metallic ribbon attaching element to a metallic part, to the product or products, and to apparatus used in connection with the method or methods.

An important object of the invention is to provide a method of the above-mentioned character which will form transversely spaced welding portions upon the leading end of the metallic ribbon attaching element and which is manipulated to bring the leading welding portions into contact with a metallic part for welding purposes.

A further object of the invention is to form openings in a metallic ribbon at longitudinally spaced points and to sever the ribbon at the openings for providing metallic ribbon attaching elements of proper length, having transversely spaced welding portions at their leading ends and transversely spaced attaching portions at their trailing ends.

A further object of the invention is to form the transversely spaced attaching portions thin or tapered for ready embedding in a plasticized rod, such attaching portions having laterally and inwardly facing extensions affording hook-shaped ends for securely attaching the extensions to the rod.

A further object of the invention is to provide a method of and apparatus for forming metallic ribbon attaching elements from a metallic ribbon and welding such elements to sleeves or the like of gun component parts of cathode tubes.

A further object of the invention is to improve upon the method disclosed in my co-pending application for Method of Forming and Welding Pins to Metal Parts, Serial Number 421,262, filed April 16, 1954.

Other objects and advantages of the invention will be apparent during the course of the following description.

In the accompanying drawings forming a part of this application and in which like numerals are employed to designate like parts throughout same, Figure 1 is a plan view of a metallic sleeve and a metallic ribbon, illustrating the stamping and welding steps, Figure 2 is a side elevation of the same, partly diagrammatic, illustrating the first step in the method, Figure 3 is a similar view, showing the parts in the adjusted position, illustrating the second step in the method, Figure 4 is a similar view, with parts adjusted, illustrating the third step in the method, Figure 5 is a similar view, with parts adjusted, illustrating the fourth step in the method, Figure 6 is a similar view, with parts adjusted, illustrating the fifth step in the method, Figure 7 is a similar view, with parts adjusted, illustrating the sixth step in the method, Figure 8 is a side elevation of a plurality of metallic sleeves or parts having the metallic ribbon attaching elements welded thereto and the outer ends of such elements embedded in a glass rod, Figure 9 is a plan view of one of the metallic sleeves and the metallic ribbon attaching elements welded thereto, and, Figure 10 is a transverse section taken on line 10—10 of Figure 9.

In the drawings, the numeral 10 designates a metallic part or sleeve included in the gun component part of a cathode tube. This metallic sleeve may be formed of steel, nickel or any other metal or metallic alloy. Metallic ribbon attaching elements are to be welded to this sleeve and extend radially thereof. This sleeve is removably mounted upon a cylindrical mandrel or support 11, which is horizontally arranged and is mounted upon a fixed support and is intermittently turned upon its longitudinal axis, the sleeve 10 being fixed upon the mandrel to turn therewith. The mandrel 11 is electrically connected with one side of a welding circuit and constitutes one electrode. Arranged near and spaced from the mandrel 11 is an electrode 12 including two jaws 13. These jaws are suitably supported to be reciprocated horizontally toward and from the mandrel 11. The electrode 12 is connected with the opposite side of the welding circuit. The electrode 12 has its jaws 13 receiving a flat metallic ribbon 14 between them. This ribbon may be formed of any suitable metal, such as steel, nickel, or any suitable metallic alloy. The metallic ribbon has its leading end welded to the metallic sleeve 10, as will be explained.

The numeral 15 designates a lower die and 16 is an upper die. These dies are supported and guided for accurate vertical movement and may be operated by any suitable means. The lower die carries an upwardly projecting vertical blade 17, having a face 17', and the upper die or punch 16 carries a depending vertical blade 18, having a face 18', for shearing action with the face 17'. The upstanding blade 17 is provided at its top with an inclined face or shoulder 19, and the die or punch 16 has an inclined shoulder 20, disposed opposite the shoulder 19. The shoulders 19 and 20 converge from the mandrel 11, as shown, and these inclined shoulders 19 and 20 serve to taper or thin the trailing end of the metallic ribbon attaching element.

In the practice of the method, the metallic ribbon 14 is intermittently fed forwardly in a longitudinal direction toward the mandrel 11 and passes over a tubular stationary die 21, above which is a vertical reciprocatory punch 22. The punch descends and stamps circular openings 23 in the ribbon 14 and these openings are equidistantly longitudinally spaced upon the ribbon and are also spaced from the longitudinal edges of the ribbon, as shown. The ribbon is severed after its leading end is welded to the sleeve 10, and this severing forms leading transversely spaced welding portions or extensions 24, and trailing transversely spaced attaching portions or extensions 25. The severing is upon a line 15', extending transversely of the ribbon and passing through the opening 23, and spaced rearwardly from the center of this opening 23. The welding portions 24 are shorter than the attaching portions 25. The opening 23 is circular and due to the position of the severing line 15', the attaching portions 25 have their free ends projecting inwardly, providing hook-like formations. The severing is at right angles to the longitudinal axis of the ribbon and the leading welding portions 24 have butt ends and the trailing attaching portions 25 also have butt ends until they are tapered or thinned, as will be described. The metallic sleeve 10 is held stationary upon the stationary mandrel 11. The jaws 13 have the metallic ribbon 14 arranged between them and when the jaws 13 are moved horizontally toward the mandrel 11, they first slide upon the ribbon, from the position shown in Figure 3, until the forward ends of the jaws 13 are near and spaced from the free ends of the ribbon 14, Figure 2, at which time the jaws clamp against the ribbon. The jaws now continue to move toward the sleeve 10 and these jaws bring the severed butt ends of the welding portions 24 into contact with the metallic sleeve 10. The blades 17 and 18 are now in the opened position and hence the jaws can pass between them. The welding portions are now brought into firm contact with the sleeve and yieldingly pressed against the sleeve, and the welding circuit is closed and the welding portions 24 are welded to the sleeve 10. This step is illustrated in Figures 2 and 7. The jaws 13 now release the ribbon 14 against clamping engagement and slide rearwardly along the ribbon and are disposed rearwardly beyond the blades 17 and 18, Figure 3. The next step in the method is to sever the ribbon 14 and produce the metallic ribbon attaching element 14' and the welding portions 24 and the attaching portions 25, as explained. The distance between the blades 17 and 18 and the sleeve 10 defines the length of the metalic ribbon attaching element. The die 15 is now moved vertically upwardly and the punch 16 vertically downwardly, Figure 4. The blade 18 now has shearing action with the blade 17 and the faces 17' and 18' contact or have shearing action. The severing of the ribbon occurs at the line 15'. The severing line 15' is at right angles to the longitudinal axis of the ribbon and is spaced from the sleeve 10 the proper distance for producing the metallic ribbon attaching element 14' of the desired length, as stated, and such metallic ribbon attaching element 14' extending to the severing line 15', contacts with the shearing face 18'. The severing line 15' intersects the adjacent circular opening 23 and is eccentric to this opening and is spaced rearwardly from the center of the opening and this causes the leading welding portions 24 to be shorter than the trailing attaching portions 25, as explained. The high point of the inclined shoulder 19 contacts with the metallic ribbon attaching element 14' while the shoulder 20 is spaced from the element 14'. Before the inclined faces 19 and 20 have clamping engagement with the metallic ribbon attaching element 14' to taper or thin the attaching portions 25, the die 15 and punch 16 with their blades 17 and 18 are shifted horizontally a slight distance so that the end of the metallic ribbon attaching element 14' becomes spaced from the faces 17' and 18', which still slidably contact with each other. This step is clearly shown in Figures 5 and 6. The next step in the method is to continue the movement of the die 15 and punch 16 toward each other so that the inclined faces 19 and 20 move toward each other and form the attaching portions 25 into rearwardly tapered shape having rearwardly converging faces 26, Figures 6 and 7. The material of the tapered attaching portions 25 may slightly spread laterally and longitudinally, but will still remain slightly spaced from the shearing faces 17' and 18', as shown in Figure 6, so that there is no tendency for the particles of metal cut from the metallic ribbon passing between the shearing faces 17' and 18'. The die 15 and punch 16 are now returned to the open position, Figure 7, and the mandrel 11 will be turned to bring the previously formed metallic ribbon attaching element to the next position. The die 15 and punch 16 are now shifted toward the mandrel 11, in a horizontal plane, so that the faces 17' and 18' are at the normal selected distance from the sleeve 10 to accurately define the length of the metallic ribbon attaching element 14'. The jaws 13 now slide forwardly upon the ribbon 14 and then have clamping engagement with the ribbon near the leading end of the ribbon, Figure 2, and the continued movement of the jaws 13 brings the leading welding portions 24 of the ribbon into contact with the sleeve 10 and these jaws suitably press the welding portions 24 against the sleeve, and the welding occurs, and the cycle of operation is repeated.

During the severing operation, the blade 18 will bend the leading end of the ribbon 14 downwardly slightly, Figures 4, 5 and 6, but when the blades 17 and 18 are separated, the free end of the ribbon 14 returns to the straight elevated position, since the ribbon is sufficiently resilient. However, the jaws 13 reciprocating in a horizontal plane will also return the free end of the ribbon 14 to the straight horizontal position.

The various elements used in the practice of the method and the various steps performed are, of course, timed in operation. When the die 15 and punch 16 are shifted to the open position, they are held in this open position until the jaws 13 move the leading welding portions into contact with the sleeve 10, at which time the welding circuit is closed and the portions 24 welded to the sleeve 10. The jaws 13 are then shifted rearwardly out of the path of travel of the blades 17 and 18, and slide along the ribbon until the jaws 13 assume the position shown in Figure 3, and the blades 17 and 18, Figure 4, are then shifted inwardly to the closed position. After the severing operation, the die 15 and punch 16 are shifted from the severing line or the free end of the metallic ribbon attaching element 14', and continued inward movement of elements 15 and 16 cause the inclined shoulders 19 and 20 to press against the trailing attaching portions 25, to thin or taper them so that they have the rearwardly converging inclined faces 26, Figures 6 and 7. The movement of the parts 15 and 16 may be continuous and timed with respect to the horizontal movement of such parts 15 and 16 from the severing line, or there may be a dwell in the vertical movement of the parts 15 and 16, while these parts are shifted horizontally from the severing line, and after this dwell, the parts 15 and 16 continue their inward movement so that the faces 19 and 20 form the taper upon the attaching portions 25, having converging faces 26. After this operation, the parts 15 and 16 are then shifted to the open position and the mandrel is turned to bring the completed metallic ribbon attaching element 14' to the next position out of the way of parts 15 and 16, and the parts 15 and 16 are again shifted toward the mandrel 11 so that the faces 17' and 18' will be located at the severing line 15'. The various steps of the method are then repeated. It is obvious that the elements manipulated in the practice of the method may be mechanically moved or manually shifted.

In Figure 8, the metallic ribbon attaching element 14' is shown welded to the sleeve 10, and a similar element 14' is welded to the sleeve 10a and two of the elements 14' are welded to a sleeve 10b. The elements 14' have their attaching portions 25 embedded in a glass rod 11a, which had portions thereof plasticized to receive the attaching portions 25. When the glass rod cools and hardens, the attaching portions 25 are securely embedded therein, which is aided by the fact that the attaching portions are hook-shaped at their free ends. The fact that these attaching portions are tapered, renders it easy to insert them into the plasticized portions of the glass rod. The elements 14' are arranged in longitudinal groups, and all elements in one group are secured to a glass rod. There may be any suitable number of these longitudinal groups, such as three or four, Figure 10. The sleeves 10, 10a and 10b constitute gun component parts of cathode tubes.

An advantage of my invention is that the metallic ribbon attaching element 14' is welded to the metallic sleeve at transversely spaced points, and that the welding of the points is effected simultaneously, and the metallic ribbon attaching element provides a stronger construction than would be afforded by two spaced pins or wires.

It is to be understood that changes in the order of the steps of the method, and changes in the shape, size and arrangement of parts in the products may be resorted to, without departing from the spirit of the invention or the scope of the subjoined claims.

Having thus described my invention, I claim:

1. A method of securing and forming metallic ribbon-shaped attaching elements to a metal part, comprising holding the metal part in a selected position to bring a part thereof in a welding position, transversely severing a metal ribbon and forming a recess therein at the line of severing and thereby providing transversely spaced welding portions at the leading end of the metallic ribbon, moving the ribbon toward the metallic part to bring the spaced welding portions into contact with that portion of the metallic part which is in the welding position, welding said welding portions to said portion of the metallic part, transversely severing the metallic ribbon at a point spaced from the metallic part to define the length of the metallic ribbon-shaped metallic element and forming a recess in the trailing end of the metallic ribbon-shaped attaching element and a recess in the leading end of the metallic ribbon, each of the last-named recesses providing transversely spaced portions, shifting the metallic part to bring a different portion thereof into a welding position, and then repeating the cycle of steps for welding position, and then repeating the cycle of steps for welding each succeeding metallic ribbon-shaped attaching element to the metal part and forming such attaching element.

2. A method of securing and forming metallic ribbon-shaped attaching elements to a metal part, comprising holding the metal part in a selected position to bring a portion thereof itno a welding position, forming a plurality of openings in a metal ribbon and substantially equidistantly spacing said openings longitudinally of the metal ribbon, transversely severing the metal ribbon through the leading opening in said metal ribbon for forming spaced reduced welding portions, moving the leading end of the metal ribbon toward the metal part to bring the welding portions into contact with the metal part, welding the welding portions to the metal part, transversely severing the metal ribbon through the next leading opening for defining the length of the metallic ribbon-shaped attaching element and to separate the same from the ribbon and forming a recess in the trailing end of the metallic ribbon-shaped attaching element and a recess in the leading end of the metal ribbon, each of the last-named recesses providing spaced portions, shifting the metal part to bring a different portion thereof to the welding position, and repeating the cycle of steps for welding each succeeding metallic ribbon-shaped attaching element to the metal part and forming such metallic ribbon-shaped attaching element.

3. A method of securing and forming metallic ribbon-shaped attaching elements to a metal part, comprising holding the metal part in a selected position to bring a portion thereof into a welding position, forming a plurality of substantially circular openings in a metal ribbon and substantially equidistantly spacing said openings longitudinally of the metal ribbon, transversely severing the metal ribbon through the leading substantially circular opening and at a point spaced rearwardly of the center of such opening for forming reduced forwardly tapering spaced welding portions upon the leading end of the metal ribbon, moving the leading end of the metal ribbon toward the metal part to bring the welding portions into contact with the metal part, welding the welding portions to the metal part, then transversely severing the metal ribbon through the next substantially circular leading opening at a point spaced rearwardly from the center of such opening for defining the length of the metallic ribbon-shaped attaching element and to separate the same from the ribbon and forming a deep recess in the trailing end of the metallic ribbon-shaped attaching element and a shallow recess in the leading end of the metal ribbon, the deep recess forming spaced portions which increase in width toward their free ends and the shallow recess forming spaced portions which decrease in width toward their free ends, shifting the metal part to bring a different portion thereof to the welding position, and repeating the cycle of steps for welding each successive metallic ribbon-shaped attaching element to the metal part and forming such metallic ribbon-shaped attaching element.

4. A method of forming metallic ribbon-shaped attaching elements to be secured to a metal part or parts, holding a substantially flat metal ribbon and forming a plurality of separate openings therein and spacing such openings substantially equidistantly longitudinally of the metal ribbon, and transversely severing the metal ribbon through each opening for providing the substantially flat metallic ribbon-shaped attaching elements and thereby forming transversely spaced attaching portions at the rear end of the metallic ribbon-shaped attaching element and transversely spaced welding portions at the adjacent end of the metal ribbon and at the forward end of the metallic ribbon-shaped attaching element, said attaching portions and said welding portions extending longitudinally of the metallic ribbon-shaped attaching elements and arranged in the plane of the same, the pair of spaced welding portions of each metallic ribbon-shaped attaching element being adapted to be welded to a metal part and the pair of attaching portions of each metallic ribbon-shaped attaching element being adapted to be embedded within a plasticized portion of a glass rod or the like.

5. A method of forming a substantially flat metallic ribbon-shaped attaching element, comprising holding a substantially flat section of a metal ribbon and transversely severing the same to provide the substantially flat metallic ribbon-shaped attaching element, forming a recess in the forward end of said element to provide transversely spaced reduced welding portions, and forming a recess in the rear end of said element for providing a pair of transversely spaced reduced attaching portions, said welding portions and attaching portions extending longitudinally of said element and arranged in the plane of the same, the welding portions being adapted to be welded to a metal part and the attaching portions being adapted to be embedded in the plasticized portion of a glass rod or the like.

6. A method of producing metallic ribbon-shaped attaching elements for use in connecting parts of a gun component part of a cathode tube or the like, comprising holding a substantially flat portion of a relatively stiff integral metal ribbon, forming a plurality of separate openings in the metal ribbon and substantially equidistantly spacing the openings longitudinally of the metal ribbon and spacing them from the longitudinal edges of said ribbon, transversely severing the integral metal ribbon through said openings and thereby simultaneously forming pairs of recesses, the recess at the forward end of each metallic ribbon-shaped attaching element providing transversely spaced welding portions adjacent to the longitudinal edges of said element and the recess at the rear end of said element forming transversely spaced attaching portions arranged adjacent to the longitudinal edges of said element, the welding portions and the attaching portions extending longitudinally of said element and arranged in the plane of said element, the welding portions being adapted to be welded to a metal sleeve or the like and the attaching portions being adapted to be embedded in the plasticized portion of a glass rod or the like.

7. A method of producing metallic ribbon-shaped attaching elements for use in connecting parts of a gun component part of a cathode tube or the like, comprising holding a substantially flat portion of a relatively stiff integral metal ribbon, forming a plurality of separate openings of substantially the same size in the metal ribbon and substantially equidistantly spacing the openings longitudinally of the metal ribbon and spacing them from the longitudinal edges of said ribbon, transversely severing the integral metal ribbon through said openings and thereby simultaneously forming pairs of recesses, the recess at the forward end of each metallic ribbon-shaped attaching element providing transversely spaced welding portions adjacent to the longitudinal edges of said element and the recess at the rear end of said element forming transversely spaced attaching portions adjacent to the longitudinal edges of said element, forming the attaching portions so that they taper toward their free ends, the welding portions and the attaching portions extending longitudinally of said element and arranged in the plane of said element, the welding portions being adapted to be welded to a metal sleeve or the like and the attaching portions being adapted to be embedded in the plasticized portion of a glass rod or the like.

8. A method of producing a metallic ribbon-shaped attaching element for use in connection with parts of a gun component part of a cathode tube or the like, comprising holding a substantially flat portion of a relatively stiff integral metal ribbon, transversely severing the integral metal ribbon to provide an integral ribbon-shaped body portion, forming a recess in one end of said body portion and thereby providing transversely spaced welding portions, forming a recess in the opposite end of said body portion and thereby providing transversely spaced attaching portions, arranging said welding portions and attaching portions in the plane of said body portion and extending the welding portions and attaching portions longitudinally of said body portion, the welding portions being adapted to be welded to a metal sleeve or the like and attaching portions being adapted to be embedded in a plasticized portion of a glass rod or the like.

9. A metallic attaching element for use in connection with parts of a gun component part of a cathode tube or the like, said element comprising a substantially flat integral ribbon-shaped body portion, said body portion being provided at one end with transversely spaced welding portions formed integral therewith and provided at its opposite end with transversely spaced attaching portions formed integral therewith, the welding portions and the attaching portions being arranged in the plane of said body portion and extending longitudinally beyond the ends of the same.

10. A metallic attaching element for use in connection with parts of a gun component part of a cathode tube or the like, said element comprising a substantially flat integral ribbon-shaped metal body portion, said integral metal body portion being provided at one end with transversely spaced welding portions formed integral therewith and provided at its opposite end with transversely spaced attaching portions formed integral therewith, the welding portions and the attaching portions being arranged in the plane of said body portion and extending longitudinally of the body portion and projecting beyond the ends of the body portion, the welding portions decreasing in width toward their free ends and the attaching portions increasing in width toward their free ends.

11. A metallic attaching element for use in connection with parts of a gun component part of a cathode tube or the like, said element comprising a substantially flat integral ribbon-shaped metal body portion, said body portion being provided at one end with a recess which is defined by the minor portion of a circle, said recess forming welding portions which decrease in width toward their free ends, said body portion being provided at its opposite end with a recess which is defined by the major portion of the circle, said recess forming attaching portions which are longer than said welding portions and increase in width toward their free ends, the welding portions and attaching portions being arranged in the plane of said body portion and projecting beyond the ends of the same, the welding portions being adapted to be welded to a sleeve or the like and the attaching portions being adapted to be embedded within the plasticized portion of a glass rod or the like.

12. A method of securing flat wide metallic ribbon-shaped attaching elements to a metal part, comprising holding the metal part to present a portion thereof in a fixed welding position, forming a plurality of openings in a metal ribbon and spacing the openings substantially equidistantly longitudinally of the ribbon and spacing the openings from the longitudinal edges of the ribbon, severing the metal ribbon through the then leading opening of the ribbon to form a recess in the leading end of the ribbon and reduced welding portions at the then leading end of the ribbon and adjacent to the longitudinal edges of the ribbon, then feeding the ribbon longitudinally a forward step to bring the welding portions into contact with the metal part, then welding the welding portions to the metal part for holding the next leading opening spaced from the metal part, then transversely severing the metal ribbon through the then leading opening and thereby separating the attaching element from the metal ribbon and forming a recess in the trailing end of the attaching element and a recess in the then leading end of the severed ribbon, the recess in the trailing end of said element forming attaching portions and the recess in the leading end of the ribbon forming welding portions, such attaching portions and such welding portions being in the planes of the attaching element and ribbon, then moving the metal part to present another portion thereof at the welding position, and repeating the cycle of steps for welding each succeeding attaching element to the metal part.

13. A method of forming and securing an attaching element to a metal part, comprising supporting the metal part at a welding position, forming a recess in the leading end of a metal ribbon to provide reduced welding portions at the leading end, feeding the metal ribbon longitudinally forwardly a step to cause the welding portions to contact with the metal part, welding the welding portions to the metal part, forming an opening in the ribbon at a point spaced longitudinally from the welding portions and spaced from the longitudinal edges of the ribbon, arranging devices upon opposite sides of the ribbon adjacent to the opening, such devices including blades having faces to contact to provide a shearing action and shoulders arranged adjacent to the blades and rearwardly of the free ends of the blades, effecting a relative closing movement between said devices so that said faces contact to produce a shearing action and the blades sever the ribbon transversely through said opening while said shoulders are spaced from the ribbon to provide attaching portions, effecting a relative movement between the free ends of the attaching portions and said faces for spacing the free ends of the attaching portions from said faces, then continuing the relative closing movement of said devices while said faces contact to cause the shoulders to have clamping engagement with the free ends of the attaching portions to reduce the thickness of such free ends, the spacing of the free ends of the attaching portions from said faces preventing the crowding of such free ends against one of said blades.

References Cited in the file of this patent

UNITED STATES PATENTS

| | | |
|---|---|---|
| 1,350,833 | Murray | Aug. 24, 1920 |
| 1,411,340 | Gail | Apr. 4, 1922 |
| 2,210,062 | Campbell | Aug. 6, 1940 |
| 2,279,316 | Herzog | Apr. 14, 1942 |
| 2,316,597 | Kershaw | Apr. 13, 1943 |
| 2,339,884 | Schlumpf | Jan. 25, 1944 |
| 2,351,722 | Swenson | June 20, 1944 |
| 2,708,968 | Soave | May 24, 1955 |